United States Patent
Scholle

(10) Patent No.: US 10,988,018 B2
(45) Date of Patent: Apr. 27, 2021

(54) TRANSMISSION ARRANGEMENT FOR A HYBRID VEHICLE, DRIVE ARRANGEMENT, METHOD FOR THE OPERATION THEREOF, AND HYBRID VEHICLE

(71) Applicant: AUDI AG, Ingolstadt (DE)

(72) Inventor: Tassilo Scholle, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/618,510

(22) PCT Filed: Apr. 16, 2018

(86) PCT No.: PCT/EP2018/059672
§ 371 (c)(1),
(2) Date: Dec. 2, 2019

(87) PCT Pub. No.: WO2018/228738
PCT Pub. Date: Dec. 20, 2018

(65) Prior Publication Data
US 2020/0122563 A1 Apr. 23, 2020

(30) Foreign Application Priority Data
Jun. 13, 2017 (DE) ...................... 10 2017 209 932.1

(51) Int. Cl.
*B60K 6/42* (2007.10)
*B60K 17/28* (2006.01)
(Continued)

(52) U.S. Cl.
CPC ................ *B60K 6/42* (2013.01); *B60K 17/28* (2013.01); *F16H 3/663* (2013.01); *F16H 3/724* (2013.01);
(Continued)

(58) Field of Classification Search
None
See application file for complete search history.

(56) References Cited

U.S. PATENT DOCUMENTS 8,308,595 B2 * 11/2012 Noda .................. F16H 57/0473
475/5
8,801,557 B2 * 8/2014 Park ........................ F16H 3/725
475/5

(Continued)

FOREIGN PATENT DOCUMENTS

DE   11 2006 002 068 T5   6/2008
DE   10 2010 035 206 A1   3/2012
(Continued)

OTHER PUBLICATIONS

Examination Report dated Mar. 21, 2018 in corresponding German application No. 10 2017 209 9321; 18 pages including Machine-generated English-language translation.
(Continued)

*Primary Examiner* — Dirk Wright
(74) *Attorney, Agent, or Firm* — Maier & Maier, PLLC

(57) ABSTRACT

A transmission arrangement for a hybrid vehicle, in which a connection for an internal combustion engine, a connection for an electric machine, and a transmission part are arranged in a manner able to be coupled to each other. The transmission part comprises a simple Ravigneaux planetary gear set with two planetary gears (PG1, PG2) and a single ring gear. The ring gear is coupled to a spur and bevel gear transmission (KT), which forms a power takeoff of the transmission arrangement. The transmission part furthermore comprises two brakes (B1, B2) and two clutches (K1, K2) as force-locking shifting elements.

17 Claims, 3 Drawing Sheets

(51) Int. Cl.
*F16H 3/66* (2006.01)
*F16H 3/72* (2006.01)
*B60K 6/48* (2007.10)

(52) U.S. Cl.
CPC ............... *B60K 2006/4816* (2013.01); *F16H 2200/0056* (2013.01); *F16H 2200/2025* (2013.01); *F16H 2200/2041* (2013.01)

(56) References Cited

U.S. PATENT DOCUMENTS

| | | | | |
|---|---|---|---|---|
| 9,688,267 | B2 * | 6/2017 | Tsuda | B60K 6/365 |
| 10,118,478 | B2 * | 11/2018 | Watanabe | F16H 3/72 |
| 10,174,816 | B2 * | 1/2019 | Ziemer | B60K 6/442 |
| 2007/0032327 | A1 | 2/2007 | Raghavan et al. | |
| 2007/0129196 | A1 | 6/2007 | Bucknor et al. | |
| 2016/0272059 | A1 | 9/2016 | Watanabe et al. | |

FOREIGN PATENT DOCUMENTS

| | | |
|---|---|---|
| DE | 10 2012 001 846 A1 | 8/2013 |
| DE | 11 2013 000 222 T5 | 7/2014 |
| DE | 10 2014 201 254 A1 | 8/2015 |
| DE | 10 2014 223 339 A1 | 5/2016 |
| DE | 10 2014 223 340 A1 | 5/2016 |
| DE | 102016226090 A1 * | 6/2018 ............ B60K 6/365 |
| EP | 3 072 724 A1 | 9/2016 |
| FR | 3 026 062 A1 | 3/2016 |
| WO | 2016/075334 A1 | 5/2016 |
| WO | 2016/075335 A1 | 5/2016 |
| WO | 2016/075336 A1 | 5/2016 |
| WO | 2016/075337 A1 | 5/2016 |
| WO | 2018077903 A1 | 5/2018 |

OTHER PUBLICATIONS

International Search Report and Written Opinion of the International Searching Authority dated Jul. 16, 2018 in corresponding International application No. PCT/EP2018/059672; pages including Machine-generated English-language translation.
International Preliminary Report on Patentability with English-language translation of the Written Opinion dated Dec. 26, 2019 in corresponding International Application No. PCT/EP2018/059672; 12 pages.

* cited by examiner

|     | K1 | K2 | B1 | B2 | i     |
| --- | -- | -- | -- | -- | ----- |
| V1  | x  |    | x  |    | 12,03 |
| V2  | x  |    |    | x  | 8,20  |
| V3  | x  | x  |    |    | 5,85  |
| V4  |    | x  |    | x  | 3,63  |
| E1  |    |    | x  |    | 14,54 |
| E2  |    |    |    | x  | 9,90  |
| eCVT|    | x  |    |    |       |
| SL  | x  |    |    |    |       |

Fig.4

TRANSMISSION ARRANGEMENT FOR A HYBRID VEHICLE, DRIVE ARRANGEMENT, METHOD FOR THE OPERATION THEREOF, AND HYBRID VEHICLE

FIELD

The disclosure relates to a transmission arrangement for a hybrid vehicle, in which there are arranged, and coupled to each other, a connection for an internal combustion engine, a connection for an electric machine, and a transmission part of the transmission arrangement. The invention furthermore relates to a drive arrangement, a method for operating such a drive arrangement. In the following, for simplicity, the term "Ravigneaux set" shall be used in place of the term "Ravigneaux planetary gear set".

BACKGROUND

Multi-speed hybridized transmissions are already known in the prior art, to which a combustion engine and an electric machine can be mechanically coupled.

From DE 10 2014 223 339 A1 there are known a torque transmission device and a method for its operation. The device is intended in particular for a motor vehicle and comprises an input shaft, which can be rotatably connected to an internal combustion engine, two planetary gear sets, a power takeoff shaft, an electric machine, a brake device and three disengaging clutches. Both of the planetary gear sets each have their own ring gear.

DE 10 2014 201 254 A1 discloses a transmission arrangement and a drive train for a hybrid vehicle as well as a corresponding hybrid vehicle. The transmission arrangement comprises an electric machine, connected to an input shaft, a combustion engine input shaft, connected to a combustion engine, an output shaft, as well as a Ravigneaux set, whose frame can be secured by means of a brake on a transmission housing. The transmission arrangement is characterized by a shiftable clutch assembly, by means of which the frame and a second sun of the Ravigneaux set as well as the combustion engine input shaft can be selectively coupled together to transmit torque. Furthermore, the transmission arrangement comprises an auxiliary shaft, which passes lengthwise through the transmission arrangement as a coaxial central shaft. The auxiliary shaft stands in operative connection on the one hand with the brake and on the other hand with the shiftable clutch assembly. In this way, in particular, the combustion engine input shaft, a shaft of the second sun and the auxiliary shaft are respectively joined together in pairs. All three shafts can also be joined together simultaneously. Furthermore, there also exists a neutral position, so that five shift positions can be realized by means of the shiftable clutch unit.

SUMMARY

Advantageous embodiments of the invention are indicated in the following description as well as in the dependent patent claims and in the figures.

In the transmission arrangement according to the invention for a hybrid vehicle there are arranged, and coupled to each other, a connection for an internal combustion engine, a connection for an electric machine, and a transmission part. The transmission part comprises a first and a second clutch, a first and a second brake, as well as a Ravigneaux set. The Ravigneaux set is composed of precisely one ring gear, a first and a second sun gear, a first and a second planetary gear set, and a planet gear carrier, on which the two planetary gear sets are rotatably mounted. In usual manner, each time a sun gear and a planetary gear set as well as the two planetary gear sets mesh with each other and one of the planetary gear sets meshes with the encircling ring gear. The connection for an internal combustion engine can be coupled via the first clutch to the first sun gear and via the second clutch to the planet gear carrier. Can be coupled means here that the coupling state or clutch state is dependent on the shifting state of the respective clutch. The connection for an electric machine is mechanically coupled to the first sun gear and can be coupled via the first clutch to the connection for the internal combustion engine. The first brake is designed for the detachable engagement of the planet gear carrier and the second brake is designed for the detachable engagement of the second sun gear. The ring gear is coupled to a spur and bevel gear transmission, which forms a power takeoff of the transmission arrangement, or can be coupled, connected, or rotatably connected to a power takeoff in torque-transmitting manner. For example, the ring gear can be coupled across a spur gear transmission, which can be mounted behind the spur and bevel gear transmission, to the latter. Thanks to the spur and bevel gear transmission, the transmission arrangement has especially flexible application. Especially advantageously, the transmission arrangement can be adapted by the bevel gear transmission especially easily to the available design space on the hybrid vehicle. It is of particular advantage, for example, that the bevel gear transmission makes possible a lengthwise arrangement of the transmission arrangement in the hybrid vehicle in especially low-cost manner.

In the sense of the present invention, by a hybrid vehicle is meant in particular a motor vehicle having an internal combustion engine and an electric machine—especially an electric motor—and which can be driven by means of the internal combustion engine and/or the electric motor for a propulsion of the hybrid vehicle. The connections for the internal combustion engine and the electric machine (e-machine) may comprise for example corresponding shafts or supports for corresponding shafts. In particular, the connection for the internal combustion engine may be provided and designed for the torque-transmitting connection to a crankshaft of the internal combustion engine. The connection for the electric machine may be provided and designed in particular for the connection or attachment of a rotor shaft of the electric machine.

But it should not be ruled out here that further components may be provided or arranged between the internal combustion engine and the transmission part and/or between the e-machine and the transmission part. A coupled arrangement or coupling possibility of two structural parts or components means in the sense of the present invention in particular that the two components are arranged and/or designed such that a mechanical connection, especially an uninterrupted or continuous connection of the two components can be produced by means of an appropriate shifting or operating process of a shifting element, wherein the connection is also suited in particular for the transmission of rotational movements, torques, and/or forces between the two components. Such a connection can be made or released in the present case according to the shift position of the first and/or second clutch.

The mechanical coupling of the electric machine to the first sun gear however occurs here not via or by means of a clutch. Instead, a direct or indirect, but in any case a continual mechanical connection or rotary connection designed for the transmission of a torque exists between the electric machine or the rotor shaft of the electric machine and the first sun gear. Furthermore, it should be clarified that a connection or coupling of a component or to a component may also pertain in particular to a corresponding shaft or axle of the particular component. Thus, it is self-evident that, for example the electric machine is mechanically coupled not to any given point of the first sun gear, but rather to its shaft or axis of rotation. In corresponding fashion, it will be clearly understood and discernible to the skilled person from the particular context when a term designating a component means the component as a whole or in general or in particular its shaft or axle. This may hold in particular for gears, rotating or rotatable components and concepts, such as for the ring gear, the first sun gear, the second sun gear, a planet gear or a planetary gear set, the electric machine and/or the internal combustion engine.

The transmission arrangement according to the invention may be used or employed advantageously for a drive or in a drive train of a hybrid vehicle and it then allows or enables different driving or operating modes of the hybrid vehicle. These can encompass, for example, a purely electrical driving, a pure combustion engine-type driving, and/or a hybrid drive or driving operation, wherein in the latter case a driving torque can be applied or contributed by both the internal combustion engine and the electric machine. But a driving or operating mode can also be provided in which the electric machine is operated as a generator. For this, the transmission arrangement can be designed and/or switched so that an axle, shaft, or support rotating in a corresponding direction of turning is provided at the connection for the electric machine.

Thanks to the described construction or the described structure of the transmission arrangement, a minimal component and manufacturing expense results in especially advantageous manner, so that costs and weight can be advantageously economized or minimized. It is especially advantageous in particular that only precisely one ring gear and one electric machine or a use of precisely one electric machine in or at the transmission arrangement is required or provided. Thanks to the design of the transmission arrangement for an operation making use of an internal combustion engine or a combustion engine and an e-machine or an electric motor, i.e., in particular thanks to the connection of the electric machine to the transmission arrangement as described here, a significant reduction in fuel consumption and emissions can be achieved especially advantageously during an operation or a driving operation of the hybrid vehicle as compared to a motor vehicle outfitted with a traditional drive train. Furthermore, distributed speeds and gear ratios can be realized especially favorably with the transmission arrangement according to the invention, affording or making possible an improved, comfortable and economical driving and starting. Furthermore, respective mechanical part stress and a corresponding wear can especially advantageously be kept as low as possible or be minimized, since especially low speed and torque loads occur on the shifting elements and geared parts during the operation of the transmission arrangement. This advantageously enables a lighter, cheaper, more compact and long-lived design of the transmission arrangement according to the invention as compared to traditional transmission arrangements or those known in the prior art.

In a further embodiment of the invention, it is provided that the transmission arrangement has eight operating modes or gears. These comprise in the present case four combustion engine-type or hybrid operating modes, two electric motor-type operating modes, one variable driving operation (eCVT or electronic continuously variable transmission operating mode) and one parked charging operating mode. In the combustion engine-type or hybrid operating modes, a proportional drive power for the hybrid vehicle can be provided by means of the internal combustion engine, wherein the e-machine can provide a contribution or portion. In the electric motor-type operating modes, the drive power used or expended for the propulsion of the hybrid vehicle is generated or provided solely by the electric machine. In the eCVT operating mode, a rotary speed can be adjusted or dictated for example by or through the internal combustion engine and the electric machine, respectively, resulting in a self-adjusting initial rotary speed and/or initial torque at the power takeoff of the transmission arrangement. The drive torque used for the propulsion of the hybrid vehicle can be generated or provided entirely or for the most part by the internal combustion engine. The electric machine can be operated as a generator or a motor, depending on the currently present rotary speed range. Based on a specific shifting of the planetary gear set or the Ravigneaux set, a positive or negative direction of turning of the electric machine will result, depending on the rotary speed. Thus, there are generator-type and motor-type operating ranges of the electric machine, according to the direction of rotation.

The eCVT operating mode or speed can thus be used as a full-value speed or drive gear. This is also possible in particular when a traction battery of the hybrid vehicle electrically connected to the electric machine is empty or cannot provide adequate electrical voltage or power for the driving of the hybrid vehicle.

Preferably, the transmission arrangement can be designed or constructed such that a relatively short gearing is produced in the eCVT operating mode, so that an especially large traction force is provided or available during driving and starting. This especially advantageously enables a comfortable and reliable driving and starting of the hybrid vehicle, especially also in loaded state, or for example when hauling a trailer. In the generator-type operation, the electric machine can charge the traction battery of the vehicle. This may result especially advantageously in an increasing or enlarging of the driving range of the vehicle. Advantageously, the eCVT operating mode can be designed for example for a stop and go operation or a crawling.

In the parked charging operating mode, the electric machine can be operated as a generator fed by or driven by the internal combustion engine for the charging of the traction battery or some other energy accumulator or also for generating a useful voltage at an electrical output or connection. The internal combustion engine can be operated here especially advantageously in an especially efficient range or condition in continuous duty.

Thus, on the whole, the transmission arrangement according to the invention advantageously provides especially flexible operating modes suitable for different driving and operating situations. Thanks to the especially advantageous gear ratios and the extensive and flexibly usable choice of operating modes, the transmission arrangement can be used especially advantageously overall, especially in terms of achievable values of a power range, a torque range, a rotary speed and an overall efficiency of a drive train of the hybrid vehicle or the entire hybrid vehicle.

In a further embodiment of the present invention, it is provided that the transmission arrangement has two electric motor-type operating modes, wherein one ratio of their transmission ratios is less than 2.5, preferably between 1 and 2, especially preferably between 1.2 and 1.8. Thus, a relatively small increment is provided here between the two electric motor-type operating modes. This makes possible especially advantageously an especially good driving and shifting process as well as especially high efficiency during the operation of the transmission arrangement and/or the hybrid vehicle. Also, in this way, an available rotary speed range of the electric machine can be optimally utilized. The two electric motor-type operating modes mentioned here may be or may correspond to the two electric motor-type operating modes.

In a further embodiment of the present invention, it is provided that the transmission arrangement has an eCVT operating mode, in which this is operated as a generator or as a motor when an electric machine is connected to the connection for an electric machine, depending on the rotary speed. This eCVT operating mode or gear may be the eCVT operating mode or it may correspond to this.

In a further embodiment of the present invention, it is provided that the connection for an internal combustion engine is coupled via a damper flywheel, especially a dual mass flywheel, to the transmission part. The damper flywheel may also be or become arranged on a side of the connection for an internal combustion engine facing away from the transmission part. A primary centrifugal mass of the damper flywheel may be arranged on a side facing toward the adjacent or adjoinable internal combustion engine and a secondary centrifugal mass of the damper flywheel may be arranged on a side facing toward the transmission part. Thanks to this arrangement, a moment of inertia of the rotating transmission parts can be advantageously increased. The two centrifugal masses may be or become joined together for example by corresponding spring elements, by which a resonance frequency of the damper flywheel can advantageously be significantly decreased. Thus, it is possible to avoid or minimize an excitation, especially by an idle speed or also by a driving speed of the internal combustion engine or potentially exciting engine orders. The use of the dual mass flywheel especially advantageously makes possible an efficient rotary vibration decoupling of the internal combustion engine from the drive train, which is realized with low component expense, and advantageously an additional damper element can be omitted.

In a further embodiment of the present invention, it is provided that the connection for an electric machine is coupled via a spur gear stage to the transmission part. The spur gear stage may comprise one gear designed as a spur gear or multiple gears designed as a spur gear. The spur gear stage makes possible a flexible or adapted spatial arrangement of the e-machine relative to the transmission part. In this way, an especially compact arrangement can be realized especially advantageously and thus the design space required on the whole for the drive train of the hybrid vehicle can be minimized. In particular, advantageously, it is not necessary to arrange the e-machine in such a way that its rotor shaft is aligned in the lengthwise direction with a shaft of the transmission part. Alternatively to the spur gear stage, a chain, a toothed belt, or a comparable means can also be used for example for the transmitting and/or deflecting of a torque between the rotary machine and the transmission arrangement. Furthermore, the spur gear stage makes possible an optimal adaptation to a provided, available rotary speed range of the electric machine or one which is optimal in terms of efficiency.

In a further embodiment of the invention, it is provided that the connection for an electric machine is spatially arranged in such a way that, when an electric machine is connected to it, a rotor shaft of the connected electric machine is arranged truly parallel to a shaft of the Ravigneaux set and a driven axle of the hybrid vehicle and axially behind the transmission part. In this way, an especially compact and space-saving arrangement can be realized advantageously. Such an arrangement may also be called a lengthwise transmission or lengthwise concept and it can be used especially advantageously when only a limited design space is available in the hybrid vehicle in the radial direction. The rotor shaft may engage with the Ravigneaux set directly across a shaft pinion, i.e., with no other intervening gears.

In a further embodiment of the invention, it is provided that the first clutch, the second clutch, the first brake and the second brake are arranged in a common transmission range. This constitutes an especially space-saving arrangement. By the phrase "in a common transmission range" is meant in the context of the invention that the first clutch, the second clutch, the first brake and the second brake are arranged in the transmission range without intervening gear stages or other transmission stages in the longitudinal extension and additionally or alternatively in the transverse extension of the transmission arrangement.

A drive arrangement according to the invention comprises a transmission arrangement according to the invention, as well as an internal combustion engine and an electric machine. The internal combustion engine is connected to the connection for an internal combustion engine of the transmission arrangement in its designed manner, especially in shiftable torque-transmitting manner, and the electric machine is connected to the connection for an electric machine of the transmission arrangement in its designed manner A torque can also be transmitted across this connection for the electric machine. In other words, therefore, an overall arrangement of the transmission arrangement and respectively one of the internal combustion engine and the electric machine, rotatably connected to it, is provided here.

A method according to the invention for operating a drive arrangement according to the invention, comprising a transmission arrangement according to the invention, may involve one or more or all of the following enumerated eight steps or processes of the method. These may also be combined with each other and/or implemented or carried out in any given sequence. For a first combustion engine-type or hybrid operating mode, the first clutch is engaged and the first brake is locked. For a second combustion engine-type or hybrid operating mode, the first clutch is engaged and the second brake is locked. For a third combustion engine-type or hybrid operating mode, the first and the second clutch are engaged. For a fourth combustion engine-type or hybrid operating mode, the second clutch is engaged and the second brake is locked. For a first electric motor-type operating mode, the first brake is locked. For a second electric motor-type operating mode, the second brake is locked. For an eCVT operating mode, the second clutch is engaged. For a parked charging operating mode, the first clutch is engaged.

In these steps or processes of the method, it is provided each time that the particular shifting elements not mentioned, that is, the respective brakes and/or clutches not mentioned, are open. An open brake is shifted or adjusted in such a way that a component which can be secured by this brake upon closing or blocking of the brake can rotate freely, that is, not hindered or restricted by the brake. An open clutch is shifted, arranged, or adjusted in such a way that the components coupled together by this clutch, even during rotation, neither transmit this rotation nor a torque to each other or to the other respective component. Furthermore, it is provided here and likewise generally in the context of the present invention that each time only precisely one component is secured or locked by a closing of a brake of the transmission arrangement. For example, by a blocking or closing of the second brake, only the second sun gear is secured, restrained, or locked, but no other component, especially no other rotatable axle or shaft, and no other gear of the transmission arrangement. Likewise, the two clutches of the transmission arrangement each time can only couple together directly the two mentioned components.

A hybrid vehicle according to the invention comprises a drive arrangement according to the invention, which in turn comprises a transmission arrangement according to the invention.

The embodiments and the respective advantages mentioned thus far and described in the following for the transmission arrangement according to the invention, the drive arrangement according to the invention, the method for operating a drive arrangement according to the invention and the hybrid vehicle according to the invention may be transferred or interchanged mutually between each other. This also holds in particular for the components and devices used or which can be used to carry out the method according to the invention.

BRIEF DESCRIPTION OF THE DRAWINGS

Further features, details and advantages will emerge from the following description of preferred exemplary embodiments of the invention and with the aid of the drawing. There are shown.

DETAILED DESCRIPTION

Figure 1:
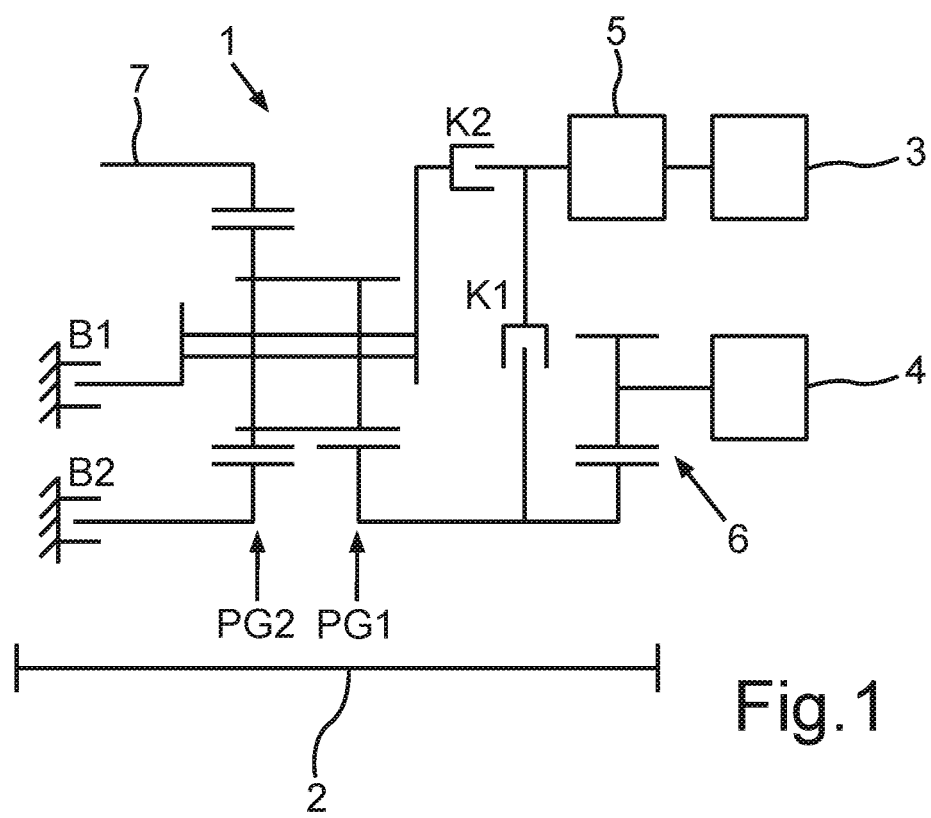
FIG. 1 a schematic representation of a structure of a drive arrangement according to one embodiment of the invention.

FIG. 1 shows a schematic representation of a structure of a drive arrangement 1, which is composed of or constructed from a transmission arrangement 2, an internal combustion engine 3 and an electric machine or e-machine 4. The internal combustion engine 3 in the present instance is connected across a damper flywheel, which is designed here as a dual mass flywheel 5, to the transmission arrangement 2. The e-machine 4 on the other hand is connected in the present instance across a spur gear stage 6 to the transmission arrangement 2.

The transmission arrangement 2 comprises a simple Ravigneaux set having a first planetary gear PG1 and a second planetary gear PG2. The first planetary gear PG1 comprises a first sun gear or a first sun and a first planetary gear set. The second planetary gear PG2 comprises a second sun gear or a second sun and a second planetary gear set. The Ravigneaux set furthermore comprises a planet gear carrier, on which the two planetary gear sets are rotatably mounted or braced, as well as a ring gear meshing with the second planetary gear set, that is, with the planetary gear set of the second planetary gear PG2. In the following, the planetary gear set of the first planet gear PG1 shall be called the first planetary gear set and the planetary gear set of the second planetary gear PG2 shall be called the second planetary gear set. The two planetary gear sets may preferably each comprise three planet wheels. In this way, an optimal equilibrium can be achieved between a torque being transmitted and a space or design requirement for the planetary gears PG1, PG2.

It should be emphasized that the Ravigneaux set comprises only precisely one single ring gear. This ring gear in the present instance is coupled across a power takeoff spur gear stage 9 to a spur and bevel gear transmission KT, which forms a power takeoff 7 of the transmission arrangement 2. In other words, an output or drive torque is provided here across the ring gear, which is then channeled by means of the spur and bevel gear transmission KT for example to a driven axle or a driven wheel of the hybrid vehicle.

The transmission arrangement furthermore comprises four force-locking shifting elements, namely, a first clutch K1, a second clutch K2, a first brake B1 and a second brake B2. The two clutches K1, K2 may each be designed for example as a wet multiplate clutch or as a dry disk clutch. All four shifting elements K1, K2, B1, B2 may be shifted or moved reversibly back and forth between an open and a engaged state or shifting state.

In the present case, the planet gear carrier or frame of the Ravigneaux set can be secured, held or locked by means of the first brake B1. The second sun gear, that is, the sun gear of the second planetary gear PG2, can be secured, held or locked by means of the second brake. The internal combustion engine 3 can be coupled via the first clutch K1 by means of the intervening dual mass flywheel 5 to the first sun gear, that is, to the sun gear of the first planetary gear PG1. The e-machine 4 is likewise coupled to the first sun gear or connected to the first sun gear by means of the spur gear stage 6, wherein the spur gear stage 6 may comprise a shaft pinion driven via the e-machine 4. Consequently, by a closing of the first clutch K1, a torque-transmitting mechanical coupling or connection of the internal combustion engine 3 to the e-machine 4 can be produced. The e-machine 4 in this case is connected clutch-free to the first sun gear. This clutch-free connection of the e-machine 4 represents a durable mechanical connection or rotary connection, at least in operation, although the e-machine 4 may of course be removed nondestructively and reversibly from the drive arrangement 1 and thus be disconnected from the transmission arrangement 2. The internal combustion engine 3—once again by means of the dual mass flywheel 5—can be coupled to the planet gear carrier across the second clutch K2.

Figure 2:
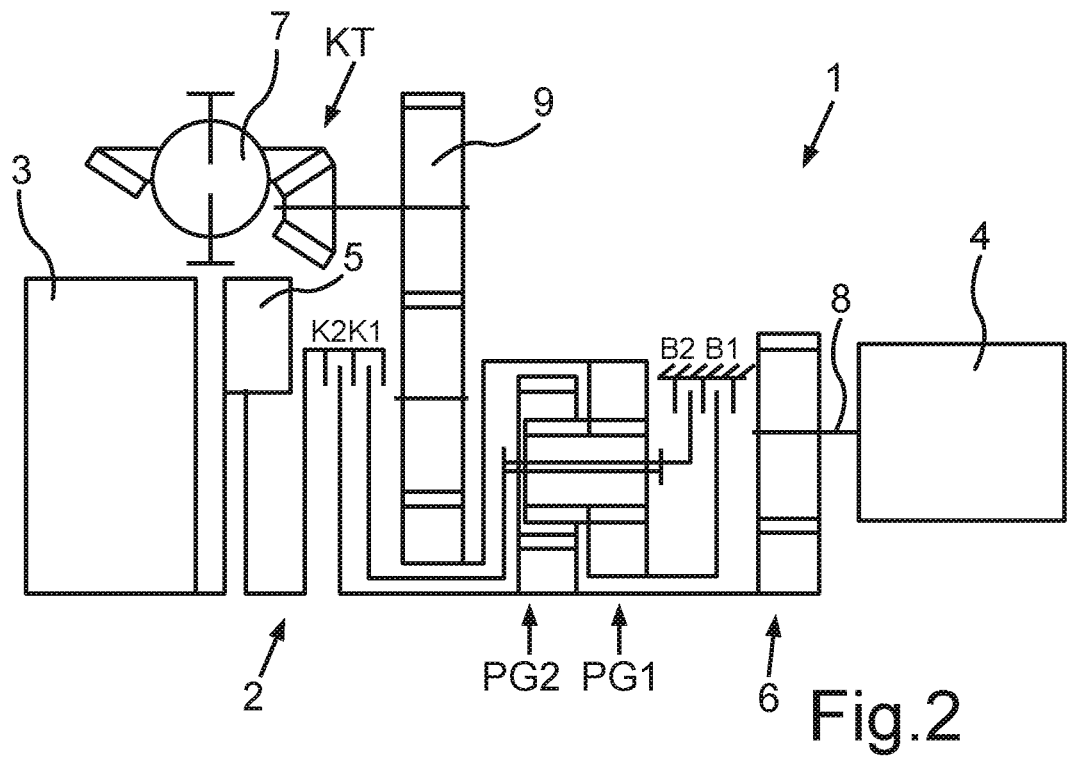
FIG. 2 a schematic representation of a gearing of the structure of FIG. 1.
Figure 3:
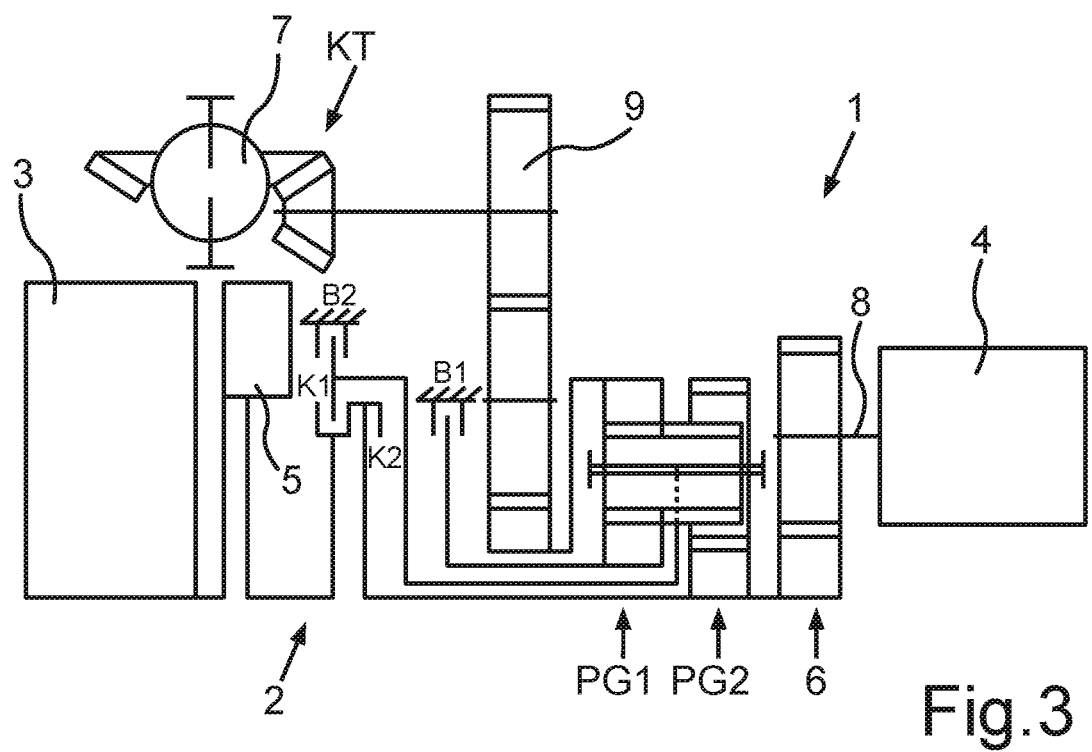
FIG. 3 a further schematic representation of a gearing of the structure of FIG. 1 and FIG. 4 a summary table of possible operating modes of a transmission arrangement with respective shifting states of shifting elements of the transmission arrangement as well as corresponding exemplary gearing.

The structure described with the aid of FIG. 1 or the described layout of the drive arrangement 1 can also be understood with the aid of one possible arrangement of the drive arrangement 1, represented schematically in FIG. 2 or in FIG. 3. This shows, each time in alternative representations, the structural parts or components already represented in FIG. 1 and explained there and indicated accordingly with the same reference numbers. The spur gear stage 6 is shown here in more detail, in the present instance comprising for example three gears. The spur gear stage 6 advantageously makes it possible to arrange the e-machine 4 spatially in relation to the transmission arrangement 2 so that a rotor shaft 8 of the e-machine 4 is situated truly parallel to a central shaft of the Ravigneaux set. This results in the especially compact arrangement of the drive arrangement 1 shown in FIG. 2 and FIG. 3. The rotor shaft 8 here is also arranged axially parallel, that is, parallel to an axle or shaft of the power takeoff or to the axle of the hybrid vehicle driven by means of the drive arrangement 1.

Also the power takeoff 7 or components connected to the ring gear at the power takeoff side are shown here somewhat more detailed. Thus, in the present instance, it is provided that further gears and a schematically indicated differential are arranged on a side of the ring gear facing away from the planetary gears PG1, PG2.

Except for a gear of the spur gear stage 6 indicated by a central dot and dash line and the gear arrangement at the power takeoff side, rotating or rotatable components in the presentation shown in FIG. 2, especially gears, are indicated by a horizontal line. This halved method of representation results in better clarity and comprehension.

FIG. 3 agrees in essential features with FIG. 2, so that only the differences from FIG. 2 shall be described in the following. In FIG. 3 it can be seen that the four shifting elements K1, K2, B1, B2—unlike FIG. 2—are arranged in a common transmission range, so that the advantage in general results that an especially favorable design space utilization can be accomplished in this way. The mode of operation of the four shifting elements K1, K2, B1, B2, however, is not affected by the different arrangement. Furthermore, it is evident from a joint viewing of FIG. 2 and FIG. 3 that the planetary gears PG1, PG2 in FIG. 3 are reversed in their arrangement as compared to FIG. 2.

FIG. 4 shows a table summary of available operating modes or speeds of the drive arrangement 1 shown schematically in FIGS. 1 and 2. These operating modes are listed one beneath the other in the vertical direction in a head column of the table. The four force-locking shifting elements K1, K2, B1, B2 are listed alongside each other in a head row of the table. In addition, the last column of the table shows as an example one possible transmission ratio i of the individual operating modes. It should be noted that the specific transmission ratios indicated are not necessary or do not need to be observed for the functioning of the transmission arrangement. Transmission ratios differing distinctly from the values indicated here can also be realized. In particular, an adapting or a variation of the particular transmission ratios may be provided and/or may be necessary depending for example on the particular vehicle, engine, and/or tire size.

In a first combustion engine-type speed V1, the first clutch K1 and the first brake B1 are engaged. This is indicated by the x marks in the corresponding fields V1-K1 and V1-B1. The other two empty fields in the row of the first combustion engine-type speed V1, namely, the fields V1-K2 and V1-B2, indicate that the second clutch K2 and the second brake B2 are released or open. The other table entries should be understood in analogous manner Thus, in the present case, the internal combustion engine 3 and the electric machine 4 are coupled in torque-transmitting manner to the first sun gear, the planet gear carrier being secured, held, or fixed by the engaged first brake B1. Thus, the second clutch K2 must necessarily be open in order to prevent a torque transmission from the internal combustion engine to the fixed planet gear carrier. The result here is a transmission ratio of 12.03, for example.

In a second combustion engine-type speed V2, the first clutch K1 and the second brake B2 are engaged. Here as well, therefore, the internal combustion engine 3 and the e-machine 4 are coupled in torque transmission to the first sun gear, but now the second sun gear is held fast by the second brake B2 and the planet gear carrier can rotate. The result is for example a transmission ratio of 8.20 for the second combustion engine-type speed V2.

In a third combustion engine-type speed V3, the two clutches K1 and K2 are engaged, resulting here in a transmission ratio of 5.85, for example. The internal combustion engine 3 here transmits a torque both across the second clutch K2 to the planet gear carrier and across the first clutch K1 to the first sun gear. The Ravigneaux set is thus locked or revolves as a block. This is an advantageous, especially efficient state or operation, since no mutually rotating or rolling components, especially gears, are produced.

In the three combustion engine-type speeds V1, V2, V3, the internal combustion engine 3 and the electric machine 4 are operated in parallel, that is, both the internal combustion engine 3 and the electric machine 4 can contribute to an overall drive torque.

In a fourth combustion engine-type speed V4, the second clutch K2 and the second brake B2 are engaged. The drive torque is combined via a corresponding transmission ratio on the one hand from the internal combustion engine 3 across the planet gear carrier of the Ravigneaux set and on the other hand from the electric machine 4. The transmission ratio can be determined or dictated by the design of the Ravigneaux set. This produces for the fourth combustion engine-type speed V4 a transmission ratio of 3.63, for example.

In the speeds V1, V2, V3, V4 a boost or recuperation operation of the electric machine 4 is possible. In the boost operation, the drive for the hybrid vehicle comes from the internal combustion engine 3 and the e-machine 4, as described in the corresponding passages. The recuperation is possible by analogous generator-type operation of the e-machine 4.

In a first electric motor-type speed E1, only the first brake B1 is engaged, so that only the planet gear carrier or frame is held fast. In a second electric motor-type speed E2, only the second brake B2 is engaged, so that the second sun gear is fixed. In both electric motor-type speeds E1, E2, in particular the first clutch K1 and the second clutch K2 are thus open, so that the internal combustion engine 3 is decoupled from the transmission arrangement 2. In the two electric motor-type speeds E1, E2, the entire drive torque is provided by the e-machine 4. From the presently chosen transmission ratios of the first electric motor-type speed E1 of 14.54 and the second electric motor-type speed E2 of 9.90, an increment of around 1.47 results between the two electromagnetic speeds, advantageously resulting in an especially good driving and shifting process and efficiency.

In a eCVT speed, only the second clutch K2 is engaged. In this operating mode, the electric machine 4 may be operated as a generator or a motor. The electric machine 4 as generator or motor braces the torque applied to the Ravigneaux set by the internal combustion engine 3. This produces in the first planetary gear set an equilibrium of moments and a power branching can be achieved. In other words, for example, a traction battery of the hybrid vehicle connected to the electric machine 4 can also be charged in the eCVT operating mode while the hybrid vehicle is being driven.

In a parked charging operating mode SL, only the first clutch K1 is engaged. Hence, the internal combustion engine is coupled in power-transmitting or torque-transmitting manner across the first clutch K1 to the e-machine 4. In this operating mode, the e-machine 4 is likewise operated as a generator, for example, in order to charge the traction battery of the hybrid vehicle. Unlike the eCVT operating mode, however, the hybrid vehicle in the SL operating mode is at rest and thus is not driven or propelled. This operating mode can be used for the especially efficient range boosting of the hybrid vehicle. The Ravigneaux set runs without force or load, so that the power takeoff 7 is also free of load and thus there are no effects or influences of the operation of the drive arrangement 1 on the driven axle or the driven wheel of the hybrid vehicle. For this, both brakes B1, B2 are opened in particular, so that no torque is braced within the Ravigneaux set. Only drag losses are acting in this case.

On the whole, the described arrangement and shifting produces an advantageous especially uniform gradation of the individual gears. Thus, increments between 1.4 and 1.61 result from the transmission ratios indicated in the table of FIG. 4 between two respective combustion engine-type speeds V1, V2, V3, V4, while an increment of around 1.47, likewise falling in this range, is produced between the two electric motor-type speeds E1, E2.

The invention claimed is:

1. Transmission arrangement for a hybrid vehicle, in which a connection for an internal combustion engine, a connection for an electric machine, and a transmission part are arranged in a manner able to be coupled to each other, wherein:
  the transmission part comprises exactly two clutches comprising a first clutch and a second clutch, exactly two brakes comprising a first brake and a second brake, as well as a Ravigneaux planetary gear set, wherein the Ravigneaux planetary gear set is composed of precisely one ring gear, a first and a second sun gear, a first and a second planetary gear set, and a planet gear carrier, on which the two planetary gear sets are rotatably mounted,
  the connection for an internal combustion engine can be coupled via the first clutch to the first sun gear and via the second clutch to the planet gear carrier,
  the connection for an electric machine is mechanically coupled to the first sun gear and can be coupled via the first clutch to the connection for the internal combustion engine,
  the first brake is designed for the detachable engagement of the planet gear carrier,
  the second brake is designed for the detachable engagement of the second sun gear,
  the ring gear is coupled to a spur and bevel gear transmission, which forms a power takeoff of the transmission arrangement, and
  wherein the first clutch, the second clutch, the first brake, and the second brake are all arranged in a common transmission range.

2. The transmission arrangement according to claim 1, wherein the transmission arrangement has eight operating modes, comprising
  four combustion engine-type or hybrid operating modes,
  two electric motor-type operating modes,
  one eCVT operating mode, and
  one parked charging operating mode for charging a traction battery of the hybrid vehicle, which is electrically connected to the electric machine.

3. The transmission arrangement according to claim 1, wherein the transmission arrangement has two electric motor-type operating modes, wherein one transmission ratio of the two electric motor-type operating modes is less than 2.5.

4. The transmission arrangement according to claim 1, wherein the transmission arrangement has an eCVT operating mode, in which an electric machine is operated as a generator or as a motor when said electric machine is connected to the connection for an electric machine.

5. The transmission arrangement according to claim 1, wherein the connection for an internal combustion engine is coupled via a damper flywheel to the transmission part.

6. The transmission arrangement according to claim 1, wherein the connection for an electric machine is coupled via at least one spur gear stage to the transmission part.

7. The transmission arrangement according to claim 6, wherein the connection for an electric machine is spatially arranged in such a way that, when an electric machine is connected to it, a rotor shaft of the connected electric machine is arranged truly parallel to a shaft of the Ravigneaux planetary gear set and a driven axle of the hybrid vehicle as well as axially behind the transmission part.

8. A method for operating a drive arrangement, comprising a transmission arrangement according to claim 1, as well as an internal combustion engine connected to the connection for an internal combustion engine and an electric machine connected to the connection for an electric machine, wherein:
  for a first combustion engine-type or hybrid operating mode, the first clutch is engaged and the first brake is locked,
  for a second combustion engine-type or hybrid operating mode, the first clutch is engaged and the second brake is locked,
  for a third combustion engine-type or hybrid operating mode, the first and the second clutch are engaged,
  for a fourth combustion engine-type or hybrid operating mode, the second clutch is engaged and the second brake is locked,
  for a first electric motor-type operating mode, the first brake is locked,
  for a second electric motor-type operating mode, the second brake is locked,
  for an eCVT operating mode, the second clutch is engaged, and
  for a parked charging operating mode, the first clutch is engaged.

9. The transmission arrangement according to claim 2, wherein one transmission ratio of the two electric motor-type operating modes is less than 2.5.

10. The transmission arrangement according to claim 3, wherein the transmission arrangement has an eCVT operating mode, in which an electric machine is operated as a generator or as a motor when said electric machine is connected to the connection for an electric machine.

11. The transmission arrangement according to claim 2, wherein the transmission arrangement has an eCVT operating mode, in which an electric machine is operated as a generator or as a motor when said electric machine is connected to the connection for an electric machine.

12. The transmission arrangement according to claim 4, wherein the connection for an internal combustion engine is coupled via a damper flywheel to the transmission part.

13. The transmission arrangement according to claim 3, wherein the connection for an internal combustion engine is coupled via a damper flywheel to the transmission part.

14. The transmission arrangement according to claim 2, wherein the connection for an internal combustion engine is coupled via a damper flywheel to the transmission part.

15. The transmission arrangement according to claim 5, wherein the connection for an electric machine is coupled via at least one spur gear stage to the transmission part.

16. The transmission arrangement according to claim 4, wherein the connection for an electric machine is coupled via at least one spur gear stage to the transmission part.

17. The transmission arrangement according to claim 3, wherein the connection for an electric machine is coupled via at least one spur gear stage to the transmission part.

* * * * *